United States Patent
Kakas et al.

(10) Patent No.: US 12,522,287 B2
(45) Date of Patent: Jan. 13, 2026

(54) STEER-BY-WIRE STEERING SYSTEM COMPRISING AN ADAPTED CONTROL SIGNAL, AND METHOD FOR OPERATING A STEER-BY-WIRE STEERING SYSTEM

(71) Applicants: thyssenkrupp Presta AG, Eschen (LI); thyssenkrupp AG, Essen (DE)

(72) Inventors: Peter Kakas, Budapest (HU); Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 426 days.

(21) Appl. No.: 18/273,733

(22) PCT Filed: Jan. 20, 2022

(86) PCT No.: PCT/EP2022/051175
§ 371 (c)(1),
(2) Date: Jul. 21, 2023

(87) PCT Pub. No.: WO2022/157218
PCT Pub. Date: Jul. 28, 2022

(65) Prior Publication Data
US 2024/0101189 A1   Mar. 28, 2024

(30) Foreign Application Priority Data
Jan. 25, 2021 (DE) .................... 10 2021 200 613.2

(51) Int. Cl.
*B62D 6/00* (2006.01)
*B62D 5/00* (2006.01)
*B62D 15/02* (2006.01)

(52) U.S. Cl.
CPC ............ *B62D 6/008* (2013.01); *B62D 5/006* (2013.01); *B62D 15/0215* (2013.01)

(58) Field of Classification Search
CPC ................................ B62D 5/006; B62D 6/008
See application file for complete search history.

(56) References Cited

U.S. PATENT DOCUMENTS 11,459,030 B2 * 10/2022 Kreis .................... B62D 5/006
11,794,806 B2 * 10/2023 Kodera ................ B62D 5/0496
(Continued)

FOREIGN PATENT DOCUMENTS

| CN | 201405922 Y | 2/2010 |
|----|-------------|--------|
| CN | 105468012 A | 4/2016 |

(Continued)

OTHER PUBLICATIONS

English Translation of International Search Report issued in PCT/EP2022/051175, dated May 6, 2022.

*Primary Examiner* — Long T Tran
(74) *Attorney, Agent, or Firm* — thyssenkrupp North America, LLC

(57) ABSTRACT

The present disclosure relates to a steer-by-wire steering system for a motor vehicle containing a steering shaft that can be torsionally connected to a steering handling device, a feedback actuator having an electric motor acting on a rotor shaft, a transmission by means of which the rotor shaft is connected to the steering shaft, and a first angle sensor and a second angle sensor. A control unit assigned to the steering system is designed to receive a first sensor signal S provided by the first angle sensor, to receive a second sensor signal S provided by the second angle sensor, and to provide a control signal ST for controlling the electric motor.

14 Claims, 2 Drawing Sheets

(56) References Cited

U.S. PATENT DOCUMENTS

| | | | |
|---|---|---|---|
| 11,964,709 B2* | 4/2024 | Kodera | B62D 6/00 |
| 2020/0377142 A1 | 12/2020 | Wilson-jones | |
| 2021/0213935 A1* | 7/2021 | Lu | B60C 23/04 |
| 2022/0083218 A1* | 3/2022 | Park | B60N 3/001 |
| 2022/0097761 A1* | 3/2022 | Kakimoto | B62D 5/049 |
| 2022/0194464 A1 | 6/2022 | Dähler | |
| 2022/0297747 A1* | 9/2022 | Polmans | B62D 5/0421 |
| 2023/0227101 A1* | 7/2023 | Ojima | B62D 6/002 |
| | | | 180/402 |
| 2023/0286574 A1* | 9/2023 | Ojima | B62D 5/0484 |
| 2023/0339537 A1* | 10/2023 | Yamashita | B62D 6/02 |
| 2024/0101189 A1* | 3/2024 | Kakas | B62D 15/0215 |

FOREIGN PATENT DOCUMENTS

| | | |
|---|---|---|
| CN | 106515843 A | 3/2017 |
| CN | 111634330 A | 9/2020 |
| DE | 10 2018 126 337 A1 | 4/2020 |
| DE | 10 2019 204 857 A1 | 10/2020 |
| DE | 10 2020 206 359 A1 | 12/2020 |
| JP | 2007062466 A | 3/2007 |
| JP | 2017019442 A | 1/2017 |
| JP | 2018047876 A | 3/2018 |
| WO | 2018/233846 A1 | 12/2018 |

* cited by examiner

STEER-BY-WIRE STEERING SYSTEM COMPRISING AN ADAPTED CONTROL SIGNAL, AND METHOD FOR OPERATING A STEER-BY-WIRE STEERING SYSTEM

CROSS REFERENCE TO RELATED APPLICATIONS

This application is a U.S. National Stage Entry of International Patent Application Serial Number PCT/EP2022/051175, filed Jan. 20, 2022, which claims priority to German Patent Application No. DE 10 2021 200 613.2, filed Jan. 25, 2021, the entire contents of all of which are incorporated herein by reference.

FIELD

The present disclosure generally relates to a steer-by-wire steering system for a motor vehicle.

BACKGROUND

Furthermore, the disclosure relates to a method for operating a steer-by-wire steering system containing a steering shaft that can be torsionally connected to a steering handling device, a feedback actuator having an electric motor driving a rotor shaft, a transmission by means of which the rotor shaft is connected to the steering shaft, a first angle sensor and a second angle sensor. A control unit assigned to the steering system receives a first sensor signal provided by the first angle sensor as well as a second sensor signal provided by the second angle sensor and provides a control signal for controlling the electric motor.

In the prior art, steer-by-wire steering systems are known. For example, DE 10 2019 204 857 A1 discloses a steer-by-wire steering system and a method for controlling a steer-by-wire steering system. In this case, a steering angle entered by a driver via a steering handling device is detected by an angle sensor arranged on a steering shaft and is used by a control unit for controlling a steering actuator. The control unit is also used to control a feedback actuator taking into account forces detected at the steering actuator, so that the effects of the road surface can be passed on to a driver via the steering handling device. A steer-by-wire steering system is also known from WO 2018/233846 A1, which contains a first angle sensor and a second angle sensor. In order to be able to provide improved feedback to a driver regarding a driving situation via the steering handling device, it is also known from DE 10 2018 126 337 A1 to receive further data for controlling the feedback actuator from a sensor device arranged on the wheel suspension. However, additional sensors lead to higher costs. In addition, influences within the steering system have so far been incompletely taken into account.

Thus a need exists to improve a steer-by-wire steering system and a method for operating a steer-by-wire steering system, in particular with regard to low-cost feedback regarding a driving situation via the steering handling device to a driver.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
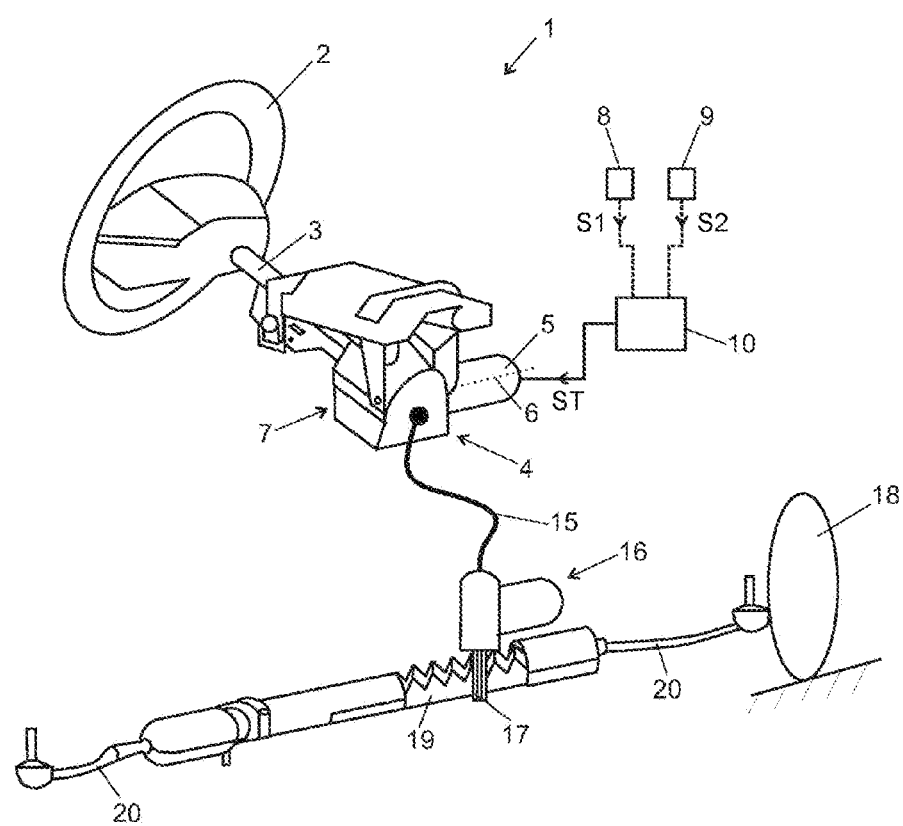
FIG. 1 shows an embodiment of a steer-by-wire steering system designed according to the disclosure in a simplified perspective representation.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a steer-by-wire steering system for a motor vehicle containing a steering shaft that can be torsionally connected to a steering handling device, a feedback actuator having an electric motor acting on a rotor shaft, a transmission by means of which the rotor shaft is connected to the steering shaft, and a first angle sensor and a second angle sensor. A control unit assigned to the steering system is designed to receive a first sensor signal provided by the first angle sensor, to receive a second sensor signal provided by the second angle sensor, and to provide a control signal for controlling the electric motor.

The proposed solution provides for a steer-by-wire steering system for a motor vehicle containing a steering shaft that can be torsionally connected to a steering handling device, in particular a steering wheel, a feedback actuator having an electric motor acting on a rotor shaft, a transmission connecting the rotor shaft to the steering shaft, and a first angle sensor and a second angle sensor. The first angle sensor is positioned on the steering shaft to detect a rotation of the steering shaft and provide it as an initial sensor signal. The second angle sensor is positioned on the rotor shaft to detect rotation of the rotor shaft and provide it as a second sensor signal. A control unit assigned to the steering system is designed to receive the first sensor signal provided by the first angle sensor, to receive the second sensor signal provided by the second angle sensor, and to provide a control signal for controlling the electric motor. The control unit is also further designed to determine a difference between the rotation of the steering shaft and the correspondingly transmitted rotation of the rotor shaft based on the first sensor signal and the second sensor signal, taking into account a model of the transmission stored in the control unit, and to adjust the control signal taking into account the difference.

In the case of an ideal steering system and transmission, where the parts, especially the components between the two angle sensors, have infinite stiffness, the first angle sensor and the second angle sensor should provide the same values, taking into account the transmission ratio of the transmission. If there is not infinite stiffness in an ideal system, there will be some difference between the two measurement positions of the angle sensors, which depends on the stiffness and the torque or force between the two position measurement points. In reality, therefore, it can be seen that deviations occur in the sensor signals provided. The disclosure is based on the realization that due to the different arrangement positions of the angle sensors the deviations can be used to determine a difference between the rotation of the steering shaft and the correspondingly transmitted rotation of the rotor shaft and to use this difference for improved control of the feedback actuator. The behavior of the transmission, in particular the transmission characteristics in different situations, is advantageously stored as a model in the control unit, wherein the model represents in particular a simulation of the transmission realized by software. In this way, influences of the transmission, especially friction influences, can be advantageously reduced and, in particular, non-existent infinite stiffness of the transmission components can be taken into account. In addition, it is advantageous to draw conclusions about torques applied to the steering handling device on the basis of parameters stored in the control unit as a model of the transmission and the sensor values recorded on the different shafts and to take these torques into account when controlling the feedback actuator, advantageously without an external sensor.

The adjustment of the control signal advantageously causes interference compensation, in particular compensation for interference caused by friction. In addition, the control signal is advantageously adjusted according to the situation in such a way that an additional motor torque is added to the original requirement and/or that the original motor torque requirement is modified by a gain in order to have more or less torque in a torque range depending on the situation.

The control unit assigned to the steering system is, in particular, an electronic control unit (ECU), in particular an ECU of a motor vehicle, preferably connected to the steering system for transmitting signals via an appropriately designed interface. In particular, in the event that the control unit assigned to the steering system is not contained in the steering system, the disclosure also provides as a solution to the problem a motor vehicle with a central control unit and a steering system designed according to the disclosure, wherein the central control unit of the motor vehicle is the control unit assigned to the steering column. In particular, however, it is also provided as an advantageous design that the steering system contains its own control unit, wherein this control unit is the control unit assigned to the steering system.

An advantageous embodiment of the proposed steer-by-wire steering system provides that at least one of the following characteristics is taken into account by the model of the transmission stored in the control unit: transmission ratio; transmission stiffness; transmission inertia; transmission backlash; transmission temperature. In particular, it is provided that corresponding parameters are stored in the model for this purpose. In particular, advantageous interference compensation can be achieved by taking one or more of these parameters into account. A parameter, such as the transmission temperature, can advantageously be dynamically adjusted. Advantageously, a sensor provides a corresponding parameter value. It is also advantageous to assign corresponding values for different situations in a lookup table. In particular, empirical values with regard to the transmission temperature may be stored for different temperature windows of an ambient temperature and/or different usage intensities of the transmission.

According to another advantageous design of the steer-by-wire steering system, values for the difference are each assigned a factor, in particular by means of a lookup table stored in the control unit. The control unit is advantageously designed to adjust the control signal by multiplying it by the factor assigned to the determined difference. This advantageously provides easy adjustability of the control signal, which ultimately leads to an improved steering feel for a driver.

Another advantageous embodiment provides that the control unit is further designed to determine the control signal according to a functional relationship, in particular a mathematical function stored in the model, taking into account the determined difference or a factor assigned to the value of the determined difference in the functional relationship, in particular to adjust the control signal taking into account the difference. In particular, a linear relationship can be taken as a basis, wherein the functional relationship is advantageously adjusted by the factor, in particular by means of a corresponding mathematical operation. However, depending on the actual characteristics of the transmission, a non-linear relationship can also be taken as a basis.

According to another advantageous design of the steer-by-wire steering system, the first angle sensor is a single-turn sensor. Alternatively or additionally, it is provided in particular that the second angle sensor is a single-turn sensor. A single-turn sensor is designed to cover only one complete revolution at a time and therefore not to detect angular ranges over 360°. Such sensors are advantageously available at low cost.

It is also advantageously provided that the first angle sensor is a multi-turn sensor. In addition or alternatively, the second angle sensor is advantageously a multi-turn sensor. A multi-turn sensor is advantageously designed to detect angles larger than 360°. A design in which the first angle sensor is a multi-turn sensor and the second angle sensor is a single-turn sensor has proven to be advantageous.

Another advantageous design of the steer-by-wire steering system provides that the transmission contains only components and/or materials with properties that can be predicted when the transmission is used in the steering system and can therefore be described in particular by means of a model that can be stored in the control unit. In particular, it is provided that the transmission has a certain stiffness, and the stiffness advantageously has a certain value with a certain—and advantageously already known—characteristic. In particular, it is provided that the stiffness of the transmission will behave linearly. If the stiffness of the transmission is non-linear, it is provided that the transmission will then have at least one known characteristic. Then the torque transmitted by the transmission is advantageously calculated on the basis of this information.

In particular, it is provided that the control unit is further designed to adjust the control signal in such a way that a torque provided by the electric motor is increased when the difference is negative. It has been shown that this can create a more realistic steering feel.

With regard to the method of operating a steer-by-wire steering system, which is also proposed to achieve the aforementioned objective, it is proposed in particular that the steer-by-wire steering system has the aforementioned characteristics, individually or in combination. In particular, the proposed method provides that the steer-by-wire steering system contains a steering shaft that can be torsionally connected to a steering handling device, a feedback actuator having an electric motor driving a rotor shaft, a transmission connecting the rotor shaft to the steering shaft, a first angle sensor and a second angle sensor. The proposed method further provides that the first angle sensor detects a rotation of the steering shaft and provides it as a first sensor signal and that the second angle sensor detects a rotation of the rotor shaft and provides it as a second sensor signal. A control unit assigned to the steering system receives the first sensor signal provided by the first angle sensor and the second sensor signal provided by the second angle sensor. The control unit also provides a control signal for controlling the electric motor of the feedback actuator, wherein the control unit determines a difference between the rotation of the steering shaft and the correspondingly transmitted rotation of the rotor shaft based on the first sensor signal and the second sensor signal, taking into account a model of the transmission stored in the control unit, and adjusts the control signal taking into account the difference. In this way, influences of the transmission, especially frictional influences, can be advantageously compensated. In addition, it is advantageous to draw conclusions about torques applied to the steering handling device on the basis of parameters stored as a model of the transmission in the control unit and the sensor values detected on the different shafts and to take these torques into account when controlling the feedback actuator, advantageously without an external sensor. The adjustment of the control signal thus advantageously causes interference compensation, in particular compensation for interference caused by friction. In addition, the control signal is advantageously adjusted for the situation in such a way that an additional motor torque is added to the original requirement and/or that the original motor torque requirement is modified by a gain in order to have more or less torque in a torque range depending on the situation.

Advantageously, at least one of the following characteristics is taken into account for the model of the transmission: transmission ratio; transmission stiffness; transmission inertia; transmission backlash; transmission temperature. In particular, advantageous interference compensation can be achieved by taking one or more of these parameters into account.

It is further advantageously provided that values for the difference are each assigned a factor, wherein the control unit adjusts the control signal by multiplying it by this factor. This advantageously provides easy adjustability of the control signal, which ultimately leads to an improved steering feel for a driver.

Another advantageous embodiment of the method provides that the control unit determines the control signal according to a functional relationship, in particular, according to a mathematical function. The determined difference or a factor assigned to the value of the determined difference is advantageously taken into account in in the mathematical function order to adjust the control signal taking into account the difference. In particular, the functional relationship takes into account at least one transmission property, in particular the behavior of the stiffness of the transmission.

In particular, it is provided that the control unit will adjust the control signal in such a way that a torque provided by the electric motor is increased if the determined difference is negative. Advantageously, this creates a more realistic steering feel.

In the different figures, the same parts are usually provided with the same reference signs and are therefore sometimes only explained in connection with one of the figures.

In FIG. 1 an exemplary embodiment of a steer-by-wire steering system 1 is shown. The steer-by-wire steering system 1 contains a steering shaft 3, on which a steering wheel is arranged as a steering handling device 2. Steering movements of a driver are detected, wherein a control unit, which in particular can also be the control unit 10 shown in FIG. 1, generates a steering actuator control signal from the detected steering movements. The steering actuator control signal is then transmitted via a cable 15 to a steering actuator 16. The steering actuator 16 controls the position of the steered wheels 18. The steering actuator 26 causes an axial displacement of a rack 19 by means of a pinion 17. The steered wheels 18 are connected to the rack 19 via tie rods 20.

In addition, a feedback actuator 4 is arranged on the steering shaft 3 of the steer-by-wire steering system 1. The feedback actuator 4 is used to transmit torque to the steering handling device 2 in order to give a driver feedback about the steering and handling behavior of a vehicle in which the steering system 1 is used. The feedback actuator 4 contains an electric motor 5, wherein the electric motor 5 acts on a rotor shaft 6 which is only indicated in FIG. 1. In particular, it is provided that the electric motor 5 is a three-phase motor, in particular a synchronous motor, furthermore in particular a permanent magnet synchronous motor. The rotor shaft 6 is connected to the steering shaft 3 via a transmission 7, wherein the transmission 7 contains only components with properties that are predictable and thus deterministic when using the transmission 7 in the steering system 1.

The steer-by-wire steering system 1 shown in FIG. 1 further contains a first angle sensor 8, which is in the form of a single-turn sensor in this exemplary embodiment, and a second angle sensor 9, which is in the form of a multi-turn sensor in this exemplary embodiment. The angle sensors 8, 9 are shown only schematically in FIG. 1. It is provided that the first angle sensor 8 is positioned on the steering shaft 3 in order to detect a rotation of the steering shaft 3 and provide it as a first sensor signal S1. Furthermore, it is provided that the second angle sensor 9 is positioned on the rotor shaft 6 in order to detect a rotation of the rotor shaft 6 and provide it as a second sensor signal S2. A control unit 10 assigned to the steering system 1, which may be contained in particular in the steering system 1 and is only schematically represented in FIG. 1, receives the first sensor signal S1 and the second sensor signal S2. In particular, it may be provided that the control unit 10 receives further signals, in particular sensor signals relating to forces acting on the steering actuator 16. The control unit 10 is designed to provide a control signal ST for controlling the electric motor 5 of the feedback actuator 4. Furthermore, the control unit 10 is designed to adjust this control signal ST based on the first sensor signal S1 and the second sensor signal S2, taking into account a model of the transmission 7 stored in the control unit. For this adjustment, the control unit 10 is designed, based on the first sensor signal S1 and the second sensor signal S2, to determine a difference between the rotation of the steering shaft 3 and the rotation of the rotor shaft correspondingly transmitted on the basis of the transmission 7, and to adjust the control signal ST taking into account this difference, in particular in such a way that a torque provided by the electric motor 5 is increased if the difference is negative. In particular, the control unit 10 may also be designed as explained with reference to FIG. 3.

Figure 2:
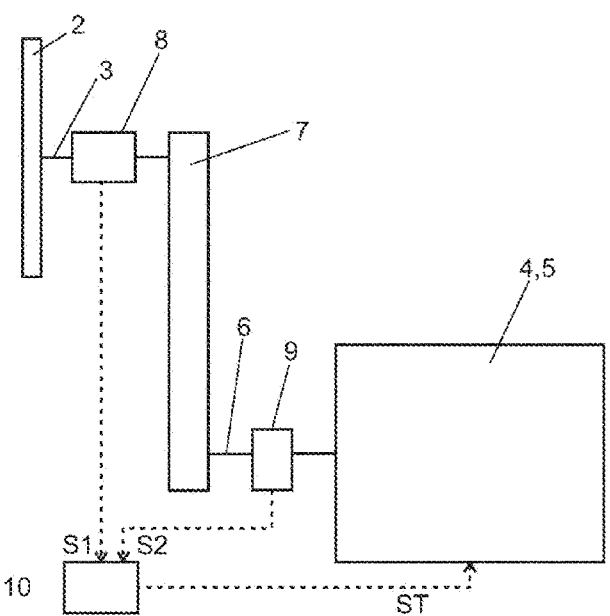
FIG. 2 shows a further embodiment of a steer-by-wire steering system designed according to the disclosure in a simplified schematic representation.

A steer-by-wire steering system 1 for a motor vehicle, containing a steering shaft 3 torsionally connected to a steering handling device 2, a feedback actuator 4 having an electric motor 5 acting on a rotor shaft 6 (not explicitly shown in FIG. 2), a transmission 7, in particular a belt drive by means of which the rotor shaft 6 is connected to the steering shaft 3, and a first angle sensor 8 and a second angle sensor 9, is illustrated in FIG. 2 in a highly simplified manner. The first angle sensor 8 is positioned on the steering shaft 3 to detect a rotation of the steering shaft 3 and provide this rotation of the steering shaft 3 as the first sensor signal S1. The second angle sensor 9 is positioned on the rotor shaft 6 to detect a rotation of the rotor shaft 6 and provide this rotation of the rotor shaft 6 as the second sensor signal S2. The steering system 1 further contains a control unit 10 which is designed to receive the first sensor signal S1 provided by the first angle sensor 8 and the second sensor signal S2 provided by the second angle sensor 9. The control unit 10 is further designed to determine a difference between the rotation of the steering shaft 3 and the correspondingly transmitted rotation of the rotor shaft 6 based on the first sensor signal S1 and the second sensor signal S2, taking into account a model of the transmission 7 stored in the control unit 10, and to provide an adjusted control signal ST for controlling the electric motor 5 taking into account this difference. In particular, it is provided that values for the determined difference are each assigned a factor via a lookup table, wherein the control unit 10 is further designed to adjust the control signal ST by multiplication by the factor assigned to the determined difference. In particular, the control unit 10 can also be designed as explained below with reference to FIG. 3.

Figure 3:
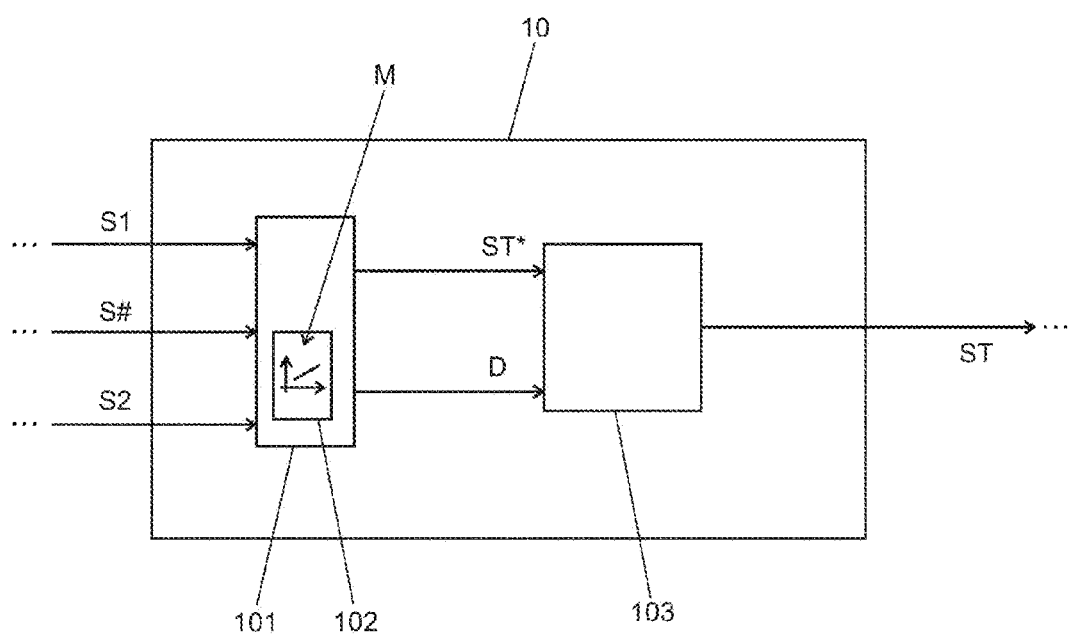
FIG. 3 shows an embodiment for a control unit designed according to the disclosure for the execution of a method developed according to the disclosure in a schematic block representation.

A control unit 10 for a steer-by-wire steering system 1 is shown schematically in FIG. 3 in a block diagram representation, as explained in particular with reference to FIG. 1 and FIG. 2. In particular, the control unit 10 may be an appropriately programmed microcontroller unit. The control unit 10 shown in FIG. 3 receives a first sensor signal S1 provided by a first angle sensor 8, which represents the rotation of a steering shaft of the steering system. In addition, the control unit 10 receives a second sensor signal S2 provided by a second angle sensor 9, which represents the rotation of a rotor shaft driven by an electric motor of a feedback actuator. In addition, it is provided that the control unit 10 receives at least one other signal S#, in particular a signal representing a torque acting on the steering shaft.

The signals S1, S2, S# are fed to an evaluation unit 101 of the control unit 10. This evaluation unit 101 contains a difference forming unit 102 as a subunit. A model M for a transmission of the steer-by-wire steering system, by means of which the rotor shaft is mechanically coupled to the steering shaft, is stored in this difference forming unit 102. The model M particularly takes into account the transmission ratio and transmission stiffness. This model M is used by the control unit 10 to determine a difference D between the rotation of the steering shaft and the correspondingly transmitted rotation of the rotor shaft based on the first sensor signal S1 and the second sensor signal S2. The evaluation unit 101 provides a corresponding signal D representing the difference. Furthermore, the evaluation unit 101 determines an unadjusted control signal ST*, which is based in particular on the at least one detected signal S#, but in particular can also be based on at least one of the sensor signals S1, S2 of the angle sensors. The control signal ST* is already suitable in principle for controlling the electric motor of the feedback actuator in such a way that a driver receives feedback regarding a current driving situation via a steering handling device of the steer-by-wire steering system.

However, if the electric motor is controlled with the control signal ST*, interference in the steering handling can be noticeable, which is due in particular to system influences on the part of the steering system and is undesirable. In order to avoid this, the unadjusted control signal ST* and the signal D representing the difference are fed to a control signal generation unit 103, in which the unadjusted control signal ST* is adjusted taking into account the difference D and as a result a control signal ST is provided for controlling the electric motor. In particular, the control signal ST is determined by the control signal generation unit 103 of the control unit 10 according to a mathematical function. The mathematical function assigns a factor to a determined difference D and multiplies this factor by the control signal ST* in order to adjust the control signal ST* taking into account the difference D.

The embodiments illustrated in the figures and explained in connection with them serve to explain the disclosure and are not restrictive for it.

REFERENCE LIST

1 Steer-by-wire steering system
2 Steering handling device
3 Steering shaft
4 Feedback Actuator
5 Electric motor
6 Rotor shaft
7 Transmission
8 First angle sensor
9 Second angle sensor
10 Control unit
101 Evaluation unit of the control unit (10)
102 Difference forming unit of the control unit (10)
103 Control signal generation unit
15 Cable
16 Steering actuator
17 Pinion
18 Wheel
19 Rack
20 Tie rod
M Model of the transmission (7)
S1 First sensor signal
S2 Second sensor signal
S# At least one further signal
ST Control signal
ST* Unadjusted control signal
D Difference

What is claimed is:

1. A steer-by-wire steering system for a motor vehicle comprising:
a steering shaft configured to be torsionally connected to a steering handling device;
a feedback actuator including an electric motor acting on a rotor shaft
a transmission through which the rotor shaft is connected to the steering shaft;
a first angle sensor; and
a second angle sensor, wherein a control unit assigned to the steering system configured to receive a first sensor signal (S1) provided by the first angle sensor, and to receive a second sensor signal (S2) provided by the second angle sensor and to provide a control signal (ST*, ST) for controlling the electric motor, wherein that the first angle sensor is positioned on the steering shaft to detect a rotation of the steering shaft and provide it as the first sensor signal (S1), that the second angle sensor is positioned on the rotor shaft to detect rotation of the rotor shaft and provide it as the second sensor signal (S2), and wherein the control unit is further configured to determine a difference between the rotation of the steering shaft and the correspondingly transmitted rotation of the rotor shaft based on the first sensor signal (S1) and the second sensor signal (S2), taking into account a model (M) of the transmission stored in the control unit, and to adjust the control signal (ST*) taking into account the difference.

2. The steer-by-wire steering system of claim 1, wherein the model (M) of the transmission stored in the control unit takes into account at least one of the following characteristics: gear ratio; transmission stiffness; transmission inertia; transmission backlash; transmission temperature.

3. The steer-by-wire steering system of claim 1, wherein values for the difference are each assigned a factor, wherein the control unit is further configured to adjust the control signal (ST*) by multiplication by the factor assigned to the determined difference.

4. The steer-by-wire steering system of claim 1, wherein the control unit is further configured to determine the control signal (ST) according to a functional relationship, taking into account the determined difference or a factor assigned to the value of the determined difference in the functional relationship in order to adjust the control signal (ST*) taking into account the difference.

5. The steer-by-wire steering system of claim 1, wherein the first angle sensor or the second angle sensor is a single-turn sensor.

6. The steer-by-wire steering system of claim 1, wherein the first angle sensor or the second angle sensor is a multi-turn sensor.

7. The steer-by-wire steering system of claim 1, wherein the transmission contains only components and/or materials with properties that are predictable when the transmission is used in the steering system.

8. The steer-by-wire steering system of claim 1, wherein the control unit is further designed to adjust the control signal (ST*) in such a way that a torque provided by the electric motor is increased if the difference is negative.

9. A method for operating a steer-by-wire steering system, which contains a steering shaft that can be torsionally connected to a steering handling device, a feedback actuator which has an electric motor driving a rotor shaft, a transmission through which the rotor shaft is connected to the steering shaft, a first angle sensor and a second angle sensor, wherein a control unit assigned to the steering system receives a first sensor signal (S1) provided by the first angle sensor, receives a second sensor signal (S2) provided by the second angle sensor and provides a control signal (ST*, ST) for controlling the electric motor, the first angle sensor detecting a rotation of the steering shaft and providing it as the first sensor signal (S1);

the second angle sensor detecting a rotation of the rotor shaft and providing it as the second sensor signal (S2); and the control unit determining a difference between the rotation of the steering shaft and the correspondingly transmitted rotation of the rotor shaft based on the first sensor signal (S1) and the second sensor signal (S2), taking into account a model (M) of the transmission stored in the control unit, and adjusts the control signal (ST*) taking into account the difference.

10. The method of claim 9, wherein the model (M) of the transmission, at least one of the following characteristics is taken into account: transmission ratio; transmission stiffness; transmission inertia; transmission backlash; transmission temperature.

11. The method of claim 9, wherein values for the difference are each assigned a factor, wherein the control unit adjusts the control signal (ST*) by multiplication by this factor.

12. The method of claim 9, wherein the control unit determines the control signal (ST) according to a functional relationship, taking into account the determined difference or a factor assigned to the value of the determined difference in the functional relationship in order to adjust the control signal (ST*) taking into account the difference.

13. The method of claim 9, wherein the control unit adjusts the control signal (ST*) in such a way that a torque provided by the electric motor is increased if the determined difference is negative.

14. The method of claim 9, wherein the steer-by-wire steering system includes the system of claim 1.

* * * * *